Patented Dec. 26, 1922.

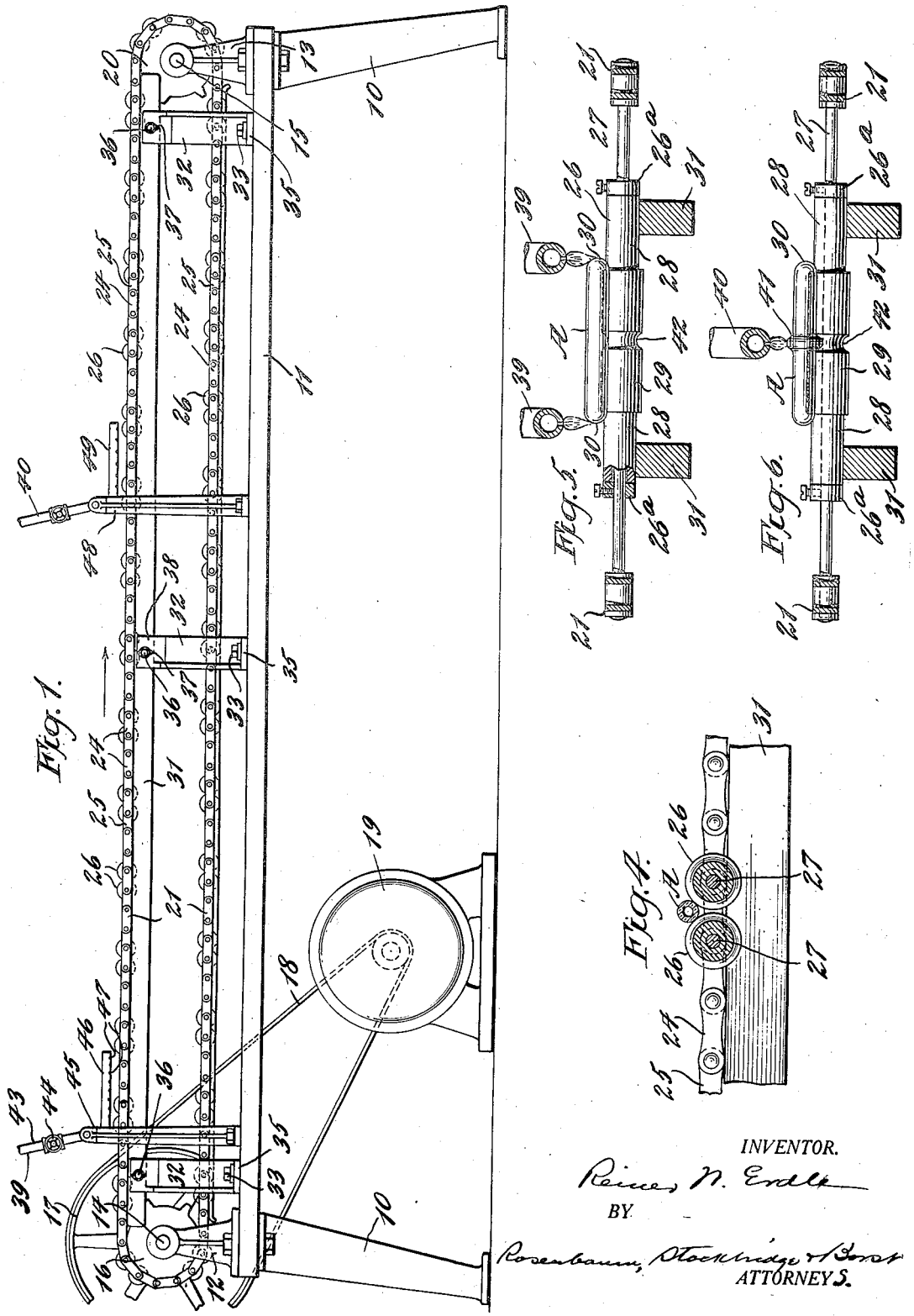

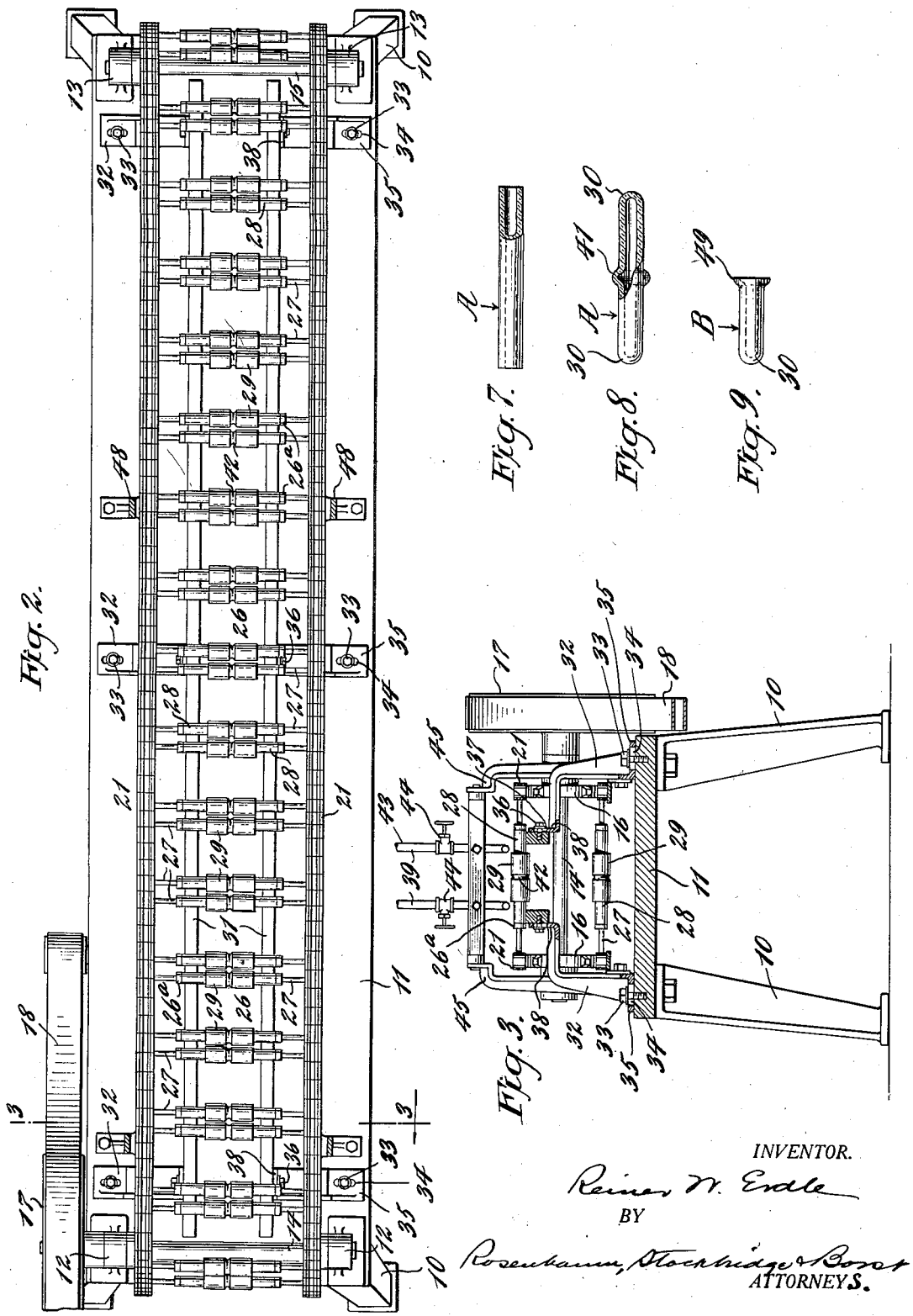

1,439,698

UNITED STATES PATENT OFFICE.

REINER W. ERDLE, OF NEW YORK, N. Y., ASSIGNOR TO THE COLD LIGHT MANUFACTURING COMPANY, A CORPORATION OF COLORADO.

PROCESS FOR FORMING GLASS ARTICLES AND THE APPARATUS FOR CARRYING OUT THE SAME.

Application filed April 5, 1919. Serial No. 287,769.

*To all whom it may concern:*

Be it known that I, REINER W. ERDLE, a subject of the present Government of Germany, residing at the city of New York, in the borough of Manhattan and State of New York, have invented certain new and useful Improvements in Processes for Forming Glass Articles and the Apparatus for Carrying Out the Same, of which the following is a full, clear, and exact description.

My invention relates particularly to the making of tubular glass containers of self-luminous materials to be attached to the ends of pull chains on electric light sockets and locate the chains in the dark. A type of such pendant is shown in my co-pending application, Serial Number 234,845, filed May 16, 1918.

These containers, which are closed at one end and open at the other, are filled with self-luminous material and the open end is sealed with a suitable plug. A sheet metal cap is secured to the open end of the container for attachment to the end of the pull chain, and in the form contemplated herein, the container is provided with a bead or enlargement at its open end over which the sheet metal cap is spun or otherwise secured.

Such containers have commonly been made heretofore individually and largely by hand, and the cost of production has therefore been relatively great. For example a common method is to take a glass tube of the proper length for one container, and roll it with one end in the region of a flame and close that end, and then heat the other end and spin the outward flare or bead thereon.

An object of my invention is to provide a method for making such containers more rapidly and cheaply than they have been heretofore produced. Another object is to provide an apparatus for carrying out the process which will be reliable in its operation and which will dispense with the necessity of skilled labor. Still other objects and advantages of my invention will appear from the following description.

In accordance with my invention I simultaneously produce two containers from a single piece of glass tubing, the bead of each container being a portion of an intermediate enlarged zone which may be formed by fusing said zone and enlarging the same by fluid pressure, such as by blowing or an equivalent method. An enlargement so formed has no internal strains and may be readily cut. Specifically the process contemplates taking a piece of glass tube of the proper length to make two containers, and first heating and sealing the ends thereof, thereby trapping the air therein, and then circumferentially heating the tube at substantially its middle point thus causing the trapped air to expand and press out the plastic glass and produce a circumferential enlargement or bead. The article thus formed is cut in two through the central enlargement or bead.

My invention also contemplates, as an apparatus for automatically performing the process, a carrier for the glass tube operative to cause the tube to rotate as it is carried along, two torches or other sources of heat through which the ends of the tube are first carried and thereby closed up, and a third torch or the like arranged to heat the middle portion of the tube after its ends have been sealed.

In the present preferred form of the apparatus, the glass is carried between two adjacent rollers which are caused to rotate in the same direction as they move along, thereby rotating the glass tube, and which are provided with central circumferential grooves to accommodate the central bead on the tube after the third torch is encountered.

Specifically the carrier consists of two adjacent endless sprocket chains which at intervals are joined by pairs of rods on which the rollers are loosely journaled, and these rollers are made to rotate by engagement of each end with a track arranged underneath the carrier.

My invention also comprehends various other features of construction and arrangements and combinations of parts as will hereinafter more fully appear.

I shall now describe the illustrated embodiment of my apparatus and shall thereafter point out my invention in claims.

Fig. 1 is a side elevation of an apparatus adopted for carrying out my process;

Fig. 2 is a plan of the same;

Fig. 3 is a section on the line 3—3 of Fig. 2;

Fig. 4 is an enlarged fragmental view showing the supporting rollers in section;

Fig. 5 is an enlarged fragmental view partly in section showing the position of the pair of torches relative to the glass to be heated thereby;

Fig. 6 is an enlarged fragmental view partly in section showing the position of the single torch relative to the glass to be heated thereby;

Figs. 7, 8 and 9 are views of the product at various stages of its manufacture.

In the embodiment illustrated there are provided standards 10 for supporting a platform 11 at the ends of which there are preferably secured suitable bearings 12 and 13 for carrying the shafts 14 and 15 respectively. Two sprockets 16 are fixed to the shaft 14 to which is also fixed the large pulley 17 which is connected by the belt 18 to be driven by the motor 19 or other suitable source of power. On the shaft 15 are mounted the sprockets 20, which are connected to the sprockets 16 by the sprocket chains 21, 21 constituting the carrier of the apparatus.

Each of the sprocket chains 21, 21 comprises essentially a plurality of successive pairs of outer links 24 and inner links 25, the ends of the outer links 24 projecting over the ends of the inner links 25 and being there pivotally joined to said inner links in the usual manner. The chains are preferably so disposed on their sprocket wheels relative to one another that the outer links 24 of one chain are opposed to the corresponding links of the other chain.

For the purpose of carrying the supporting rollers 26, particularly shown in Figs. 5 and 6, the links are joined at intervals by pairs of rods 27 which in the present instance constitute link-joining pins common to successive pairs of links in both chains 21. To facilitate access to the rollers and for other reasons which will appear herein, one entire set of links preferably intervene between successive pairs of rollers 26, as shown.

The rollers 26 are loosely journaled on the rods 27 and embrace, essentially, diminished end portions 28 and an enlarged glass supporting intermediate portion 29. The intermediate portion 29 in length is slightly shorter than the tubular glass section designated generally by A so that when said section is supported by the rollers 26 its ends 30 will be exposed. Collars 26$^a$ on the rods 27 determine the longitudinal position of the rollers on the rods.

As shown in Fig. 4, the rollers 26 act in pairs to support the glass tube A and are spaced from one another just sufficiently to form a seat between them for receiving such tube A, so that the cylindrical surfaces of the portions 29 engage the cylindrical surface of the tube A, whereby the rollers 26 when rotated will translate rotation to such tube A.

For imparting rotation to the rollers 26 two rails or tracks 31 are provided which are disposed underneath the upper runs of the chains 21 to engage the diminished ends 28 of the rollers 26. Thus it will be seen that as the chains 21 are advanced in the direction indicated by the arrow in Fig. 1, the rollers by engagement with the tracks 31 will be rotated and they in turn rotate the supported tube A. The tracks 31 are suitably secured in place by the brackets 32 of which there are three sets in the present instance, which are secured to the platform by the set screws 33 registering with the laterally extending slots 34 formed in the lower flanges 35 of the brackets, whereby the brackets may be laterally adjusted relative to the platform 11 and thereby in turn laterally adjust the tracks 31. The tracks 31 are secured to the brackets 32 by set screws 36 which register with vertically extending slots 37 formed in the vertical flanges 38 of the brackets 32, whereby the tracks may be vertically adjusted relative to the rollers 26. This adjustment becomes important due to the heating of the tracks and rollers by the heating means now to be described.

The means for heating the glass tube A embraces a pair of torches 39 for first heating the ends of the tube A as shown in Fig. 5 to seal and close such ends and thereby trap the air in said tube A; and a single torch 40 for subsequently heating an intermediate zone of the tube A, as shown, whereby upon such zone becoming plastic and the trapped air expanding due to the heat, such heated plastic zone may be expressed by the expanding air and form the bead or enlargement 41 shown in Figs. 6 and 8. To accommodate the enlargement 41, the rollers 26 are provided with intermediate grooves 42 registering with one another as shown in Fig. 2. The torches 39 are preferably of the Bunsen burner type depending for a high temperature upon the combustion of a mixture of gas and air under pressure. They have upwardly extending arms 43 provided with a controlling valve 44, and are supported by the brackets 45 extending upwardly from the platform 11. Extending laterally from the lower ends of the arms 43 and preferably in the direction of travel of the carrier there are provided the burner arms 46 having a plurality of burner openings 47 formed in their lower faces. The torches as shown in Fig. 5 are so disposed relative to the carrier that the flames will be directed against the ends 30 of the tube A. The brackets 45, and therewith the torches 39, are preferably arranged near the beginning of travel of the carrier, that is, the left hand end of the machine, looking at Fig. 1.

The torch 40 in construction is similar to the torches 39 and is mounted on brackets 48 extending upwardly from the platform 11 a distance removed from the brackets 45 and nearer to the rear end of the machine, as shown. The torch 40 is so disposed relative to the carrier that its burner arm 49 will direct a series of flames upon an intermediate portion or zone of the tube A, as shown in Fig. 6.

Due to the length of the arms 45 the tube A, while being advanced and rotated by the rollers 26, will have its ends circumferentially subjected to an extended heating zone, whereby such ends will be sealed and thus entrap the air contained in the tube. Thereupon when the tube A reaches the torch 40, its intermediate zone, in the present instance shown as its medial zone, will, by reason of its rotation, be circumferentially heated while passing through the extended heating zone. Upon the intermediate zone being so heated it will become plastic; and the expansion of the air, due to its heating, will force this plastic zone outwardly and produce the enlargement 41 shown in Fig. 6.

If the intermediate zone is not forced out to the height required during the heating operation, the operator may, by gently tapping the ends of the glass tube force out such zone to the required height.

The tube A, upon going through the aforesaid process will assume the conformation illustrated in Figs. 6 and 8. Thereupon the enlargement 41 will be severed by any suitable cutting means and produce a glass container B such as illustrated in Fig. 9 having a closed end 30 and a bead 49 around its open end.

It is obvious that various changes and modifications may be made to the details of construction without departing from the general spirit of the invention.

I claim:

1. The process of making tubular glass containers, consisting in sealing both ends of a glass tube and then heating an intermediate portion until said portion becomes plastic and enlarges under the expansive force of the trapped air and severing the glass tube through said enlargement.

2. The process of making tubular glass containers, consisting in subjecting the ends of a glass tube to a fusing heat and thereby permanently sealing the ends thereof, and subjecting an intermediate zone of said glass tube to a fusing heat until said zone becomes plastic and enlarges under the expansive force of the trapped air and severing the glass tube through said enlargement.

3. The process of making tubular glass containers, consisting in subjecting the ends of a glass tube to a fusing heat and thereby permanently sealing the ends thereof, and subjecting an intermediate zone of said glass tube to a fusing heat until said zone becomes plastic and enlarges under the expansive force of the trapped air, and severing the glass tube through said enlargement.

4. The process of making tubular glass containers consisting in simultaneously subjecting the ends of a glass tube, open at both ends, to a fusion heat and thereby sealing said ends, thereafter subjecting an intermediate zone of said glass tube to a fusion heat until said zone becomes plastic and permitting the said plastic zone under pressure of the trapped air to enlarge, and severing the glass tube through said enlargement.

5. A mechanism for making tubular glass containers comprising parallel endless conveyors, pairs of rods for joining said conveyors at intervals, tubular-glass-section supporting rollers mounted on said rods, means for advancing said conveyors, tracks engaged by said rollers and operative to cause the latter to rotate as they are advanced, whereby rotation is imparted to the glass sections, means for heating the ends of the glass sections, while they are rotated to close such ends and thus trap the air in the glass sections, and means for subsequently heating an intermediate zone of the glass sections while being so rotated to permit the trapped air to expand and enlarge the heated zone.

6. A mechanism for making tubular glass containers comprising a carrier, tubular-glass-section-supporting rollers mounted on said carrier, means for rotating said rollers to in turn rotate the supported glass section, and means for heating the ends of the section supported by said rollers to close the same and for heating an intermediate zone of the section while the section is moved relative to the heating means whereby the glass section is caused to enlarge.

7. A mechanism for making tubular glass containers, comprising a carrier, tubular-glass-section supporting rollers mounted on said carrier, means for rotating said rollers to in turn rotate the supported glass section, and means for heating an intermediate zone of the section while the section is moved relative to said heating means, there being intermediate grooves in said rollers to accommodate the enlargement formed in the intermediate zone of the section when heated.

8. A mechanism for making tubular glass containers, comprising a carrier, tubular-glass-section supporting rollers mounted on said carrier grooves in said rollers, means for rotating said rollers to in turn rotate the supported glass section, the rollers being adapted to leave the ends of the section exposed, torches disposed to heat the exposed ends of the section to close the same, and a torch disposed over the line of travel of said grooves to subsequently heat an intermediate zone of the section to there form an enlargement in the section.

9. A mechanism for making tubular glass containers, comprising a carrier, tubular-glass-section supported rollers mounted on said carrier, said rollers having grooves therein, means for advancing said carrier, track-engaging ends formed on said rollers, tracks for engaging said track-engaging ends to rotate said rollers while being advanced with said carrier, the rollers in turn translating rotation to the supported glass section, and heating means for heating portions of the glass sections while being so rotated and advanced and heating means spaced from said first heating means for heating an intermediate section of said glass, said last mentioned heating means being disposed over the path of travel of said grooves, whereby the glass under the last mentioned heating means is caused to enlarge and the enlargement accommodated by said grooves.

10. A mechanism for making tubular glass containers comprising two endless sprocket chains, pairs of rods for joining said chains at intervals, pairs of tubular-glass-section supporting rollers loosely journaled on said rods and forming a seat between them to receive and support a glass section, grooves in said rollers, means for causing the rotation of said rollers to in turn cause the rotation of the supported section, and means for heating the ends of the glass section while being so rotated to close such ends and for subsequently heating an intermediate portion of the section to there form an enlargement, said grooves accommodating the said enlargements.

11. A mechanism for making tubular glass containers comprising two endless sprocket chains, pairs of rods for joining said chains at intervals, pairs of tubular-glass-section supporting rollers loosely journaled on said rods and forming a seat between them to receive and support a glass section, grooves in said rollers, means for advancing said chain, diminished ends on said rollers, tracks for engaging said diminished ends to rotate said rollers while being advanced by said chains, the rollers in turn translating rotation to the supported glass section, and heating means for heating the end portions of the glass section while being so rotated and advanced, and heating means positioned over the path of travel of said grooves for heating an intermediate portion of the glass section.

12. A mechanism for making tubular glass containers comprising two endless sprocket chains, pairs of rods for joining said chains at intervals, pairs of tubular-glass-section supporting rollers loosely journaled on said rods and forming a seat between them to receive and support the glass section, means for advancing said chains, diminished ends on said rollers, tracks for engaging said diminished ends to rotate said rollers while being advanced by said chains, the rollers in turn translating rotation to the supported glass section, means for heating the ends of the glass section while being so rotated to close such ends, and means for subsequently heating an intermediate portion of the glass section to there form an enlargement, there being intermediate circumferential grooves in said rollers to accommodate the enlargement thus formed.

13. A mechanism for making tubular glass containers in combination, endless conveyers, rods joining said conveyers at intervals, tubular-glass-section supporting rollers journalled to revolve as said conveyers move, two of said tubular supporting rollers being adapted to form a seat for a section of tubular glass, the said supporting rollers being diminished in proximity to the points where the ends of the glass rest thereon, flames positioned over the diminished points of said supporting rollers and being adapted to fuse the ends of said glass sections and thereby cause the ends of said sections to close, a groove in the supporting rollers intermediate of the said diminished points of said rollers, flame positioned over said groove and adapted to soften the glass and cause the glass to flow toward said groove and means for revolving the said supporting rollers and glass sections while the said flames are acting thereon.

In witness whereof I subscribe my signature.

REINER W. ERDLE.